United States Patent [19]

Yoshida et al.

[11] 4,333,721

[45] Jun. 8, 1982

[54] ELECTROMAGNETICALLY DRIVEN SHUTTER

[75] Inventors: Syozo Yoshida, Machida; Yoji Sugiura, Yokohama, both of Japan

[73] Assignee: Canon Kabushiki Kaisha, Tokyo, Japan

[21] Appl. No.: 163,405

[22] Filed: Jun. 26, 1980

[30] Foreign Application Priority Data

Jul. 3, 1979 [JP] Japan ............................. 54-84179

[51] Int. Cl.³ ............................................. G03B 9/08
[52] U.S. Cl. ................................................. 354/234
[58] Field of Search ................. 354/234, 235, 209, 50, 354/51, 254, 255

[56] References Cited

U.S. PATENT DOCUMENTS 3,604,330 9/1971 Fahlenberg et al. ............... 354/235

Primary Examiner—L. T. Hix
Assistant Examiner—William B. Perkey
Attorney, Agent, or Firm—Toren, McGeady & Stanger

[57] ABSTRACT

An electromagnetically driven shutter of which the leading and trailing curtains are driven by respective electromagnetic drive sources to make a forward and backward movement. The electromagnetic drive sources each have a magnetic winding constructed in a unified form of two coils arranged to be supplied with respective currents flowing in direction opposite to each other so that the forward movement of each of the leading and trailing curtains is followed, after a controlled time interval, by the backward movement thereof.

6 Claims, 11 Drawing Figures

ELECTROMAGNETICALLY DRIVEN SHUTTER

BACKGROUND OF THE INVENTION

1. Field of the Invention

This invention relates to electromagnetically operated shutters and more particularly to improvements of a drive circuit for such shutter.

2. Description of the Prior Art

The conventional electromagnetically operated shutters have a drive circuit as shown in FIG. 1. In FIG. 1, 1 and 2 are one-shot circuits. Responsive to a leading curtain actuating signal, the first one-shot circuit 1 produces a drive control pulse of a predetermined width. Similarly, the second one-shot circuit 2 responsive to a leading curtain returning signal (from a circuit (not shown) delayed a certain time from the leading curtain actuating signal) produces a second drive control pulse of a predetermined width. Transistors 3, 4, 5 and 6 are connected to each other and to a magnetic winding 7 so that when in order to open the shutter or to initiate an exposure, the actuating signal is applied to the first one-shot circuit 1 with the production of the leading curtain drive control pulse as shown on line (1) in FIG. 2 at an output line, a, which is then applied to the transistors 3 and 6 at their bases. In this manner the transistors 3 and 6 are turned on to supply the magnetic winding 7 with current flowing in a forward direction indicated by a solid line I1, since the transistors 4 and 5, at this time, remain off. Thus, the leading curtain is driven to run down, initiating an exposure, by this electromagnetic drive source. After the termination of the exposure, the leading curtain returning signal is applied to the second one-shot circuit 2 which then produces the drive control pulse as shown on line (2) in FIG. 2. This pulse is applied to the transistors 4 and 5 at their bases, and transistors 4 and 5 are, thus, turned on. Since, at this time, the transistors 3 and 6 are already turned off, the magnetic winding 7 is supplied with current flowing in a direction indicated by a dashed line arrow I2, thus driving the leading curtain to return. Another drive circuit similar to that of FIG. 1 is provided for controlling the running down and returning operation of the trailing curtain of the shutter. The actuating signals for the leading and trailing curtain control circuits are provided in either electrically or mechanically timed relationship to obtain an exposure time.

FIG. 3 shows an example of modification of the drive circuit of FIG. 1 with addition of a circuit for preventing the leading curtain from bounding back from the terminal end of movement thereof. Elements 31, 32, 33 and 34 are one-shot circuits responsive to leading curtain running down, running brake, returning and returning brake signals respectively and produce drive pulses at their output lines, a to c. Elements 35, 36 are AND gates; 37, 38 are inverters; and 39, 40 are OR gates having outputs connected to the inputs of the transistorized portion of the circuit of FIG. 1. Elements 41 and 42 are switches as the sources of the brake signals. Though in FIG. 3 there is shown only the leading curtain drive circuit, a trailing curtain drive circuit of similar construction to the above is provided also. In operating the circuit, when, in order to initiate a running down of the leading curtain, an actuating signal is applied to the first one-shot circuit 31 which then produces a drive pulse as shown on line (1) in FIG. 4. This pulse is applied through the AND gate 35 and OR gate 39 to turn on the transistors 3 and 6. The magnetic winding 7 is thereby supplied with current flowing in the forward direction I′1. Thus, the leading curtain starts to run down. When the leading curtain nears the terminal end of movement thereof, the switch 41 is automatically closed to produce the brake signal which is then applied to the second one-shot circuit 32. The output pulse from the one-shot 32 is shown on line (2) in FIG. 4. This pulse, after having been inverted in polarity by the inverter 37 is applied to the AND gate 35, thereby the output of the AND gate 35 is changed to low level and held therein for a time t1 shown on line (2) of FIG. 4. Therefore, the output of OR gate 39 turns off the transistors 3 and 6, while the brake pulse from the one-shot circuit 32 after having passed through the OR gate 40 simultaneously turns on the transistors 4 and 5 for that time t1. As a result, the magnetic winding 7 is supplied with current flowing in the reversed direction I′2, thus stopping the leading curtain under the braking action at the terminal end of running down movement, and avoiding the bound of the leading curtain. Then, upon returning the leading curtain, a similar actuation of the one-shot circuits 33 and 34 to the above leads to the production of drive and brake pulses as shown on lines (3) and (4) in FIG. 4 which cause the supply of current flowing in the reversed direction I′2 to the magnetic winding 7 and therefore cause the returning movement of the leading curtain to terminate while preventing a bound.

Since such circuits of FIGS. 1 and 3 have to employ two transistors to supply the magnetic winding with the drive current from the battery, the voltage loss by the two transistors is so great that a battery of small capacity with low voltage such as that usually incorporated in the camera housing is not sufficient to assure the satisfactory operation of the shutter. Another disadvantage arising from the necessity of using four drive transistors in each of the leading and trailing curtain drive circuits is that the space which the eight transistors in total occupy is large. Further, since a great number of transistors must be used at a time with uniformity of characteristics thereof, it has been found that the conventional drive circuits described above are not amenable to mass production techniques.

SUMMARY OF THE INVENTION

An object of the present invention is to eliminate the above-described drawbacks and to provide an electromagnetically operated shutter of which the electromagnetic drive source has a magnetic winding constructed in a unified form of two coils arranged to be supplied with respective currents flowing in the opposite direction to each other.

Another object of the invention is to make two exposures in each cycle of shutter operation.

A further object of the invention is to select one of the two coils for employment in allowing a shutter drive current to flow therethrough, and the other for employment in allowing a shutter brake current to flow in the opposite direction to that in which the drive current flows therethrough.

DESCRIPTION OF THE PREFERRED EMBODIMENTS

Figure 5:
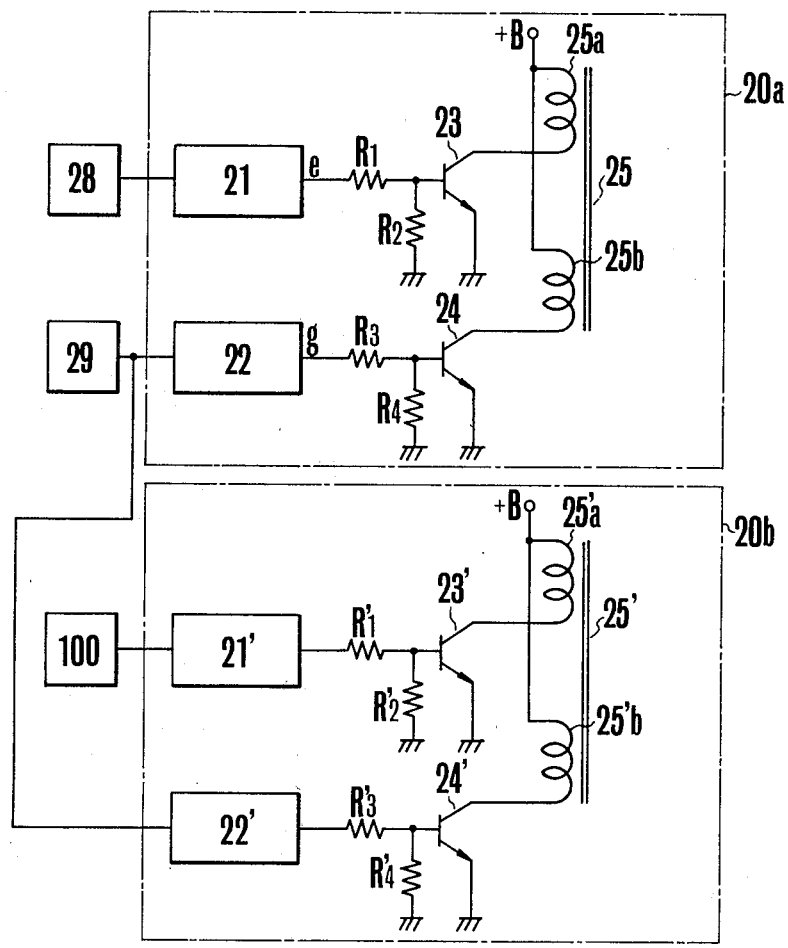
FIG. 5 is a diagram of one embodiment of a drive circuit for an electromagnetically operated shutter according to the present invention.

The present invention will next be described in connection with preferred embodiments thereof. In FIG. 5 there is shown the circuitry of an electromagnetically operated shutter comprising leading and trailing curtain drive circuits enclosed within dot-and-dash line blocks 20a and 20b respectively. The leading curtain drive circuit 20a includes two one-shot circuits 21 and 22. The first one-shot circuit 21, responsive to a signal representative of the initiation of a running down of the leading curtain from a signal forming circuit 28, produces a drive pulse of predetermined duration as shown on line (1) in FIG. 6. The second one-shot circuit 22 responsive to signal representative of a return of the leading curtain from a signal forming circuit 29 produces a drive pulse of predetermined duration as shown on line (2) in FIG. 6. Elements 23 and 24 are drive transistors; 25 is an electromagnet having two magnetic coils 25a and 25b which are turned in the opposite direction to each other so that when the coils 25a and 25b are selectively supplied with current from a common battery B, the directions of polarity of the magnetic fluxes produced are opposite to each other. While one of the ends of each of the coils 25a and 25b are connected to the positive terminal of the battery B, the other ends are connected to the collectors of the transistors 23 and 24 respectively with their emitters connected to the circuit ground. The base of the transistor 23 is connected through a resistor R1 to the output of the one-shot circuit 21 and through a resistor R2 to the circuit ground. The base of the transistor 24 is connected through a resistor R3 to the output of the one-shot circuit 22 and through a resistor R4 to the circuit ground. The trailing curtain drive circuit 20b is of the same construction as the leading curtain drive circuit 20a, and the same reference characters but primed are employed to denote similar parts, and the detailed explanation thereof is thus omitted. The above described signal forming circuit 28 is arranged upon closure of a manual switch (not shown), for example, actuation of a release button, to produce the signal. The other signal forming circuit 29 may be actuated either manually or automatically in response to the termination of a predetermined time interval (exposure time) from the start of production of the signal from the circuit 28. Element 100 is an exposure time counting circuit for producing a trailing curtain actuating signal in a time interval necessary to take a proper exposure from the start of opening of the leading curtain.

Though the leading curtain drive circuit 20a and the trailing curtain drive circuit 20b are identical in construction to each other, there is a difference between their arrangements in that whilst the one-shot circuit 21 in the leading curtain drive circuit 20a cooperates with the shutter release actuating signal forming circuit 28, the one-shot circuit 21' cooperates with the exposure time counting circuit 100.

The operation of the circuit of FIG. 5 will next be described by reference to the pulse timing chart of FIG. 6. When the leading curtain actuating signal from the signal forming circuit 28 is applied to the one-shot circuit 21, the control pulse of FIG. 6(1) is produced at the output line (e) of the one-shot circuit 21, causing the transistor 23 to turn on. Therefore, a current (FIG. 6(3)) flows through the transistor 23 to the magnetic coil 25a, causing the leading curtain to run down.

Figure 6:
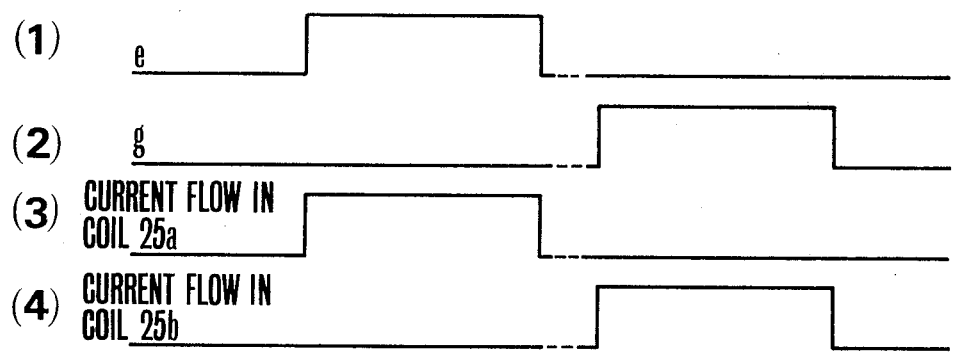
FIG. 6 is a pulse timing chart showing a manner in which the circuit of FIG. 5 operates.

In a timed interval depending upon the exposure value, the exposure control circuit 100 produces a trailing curtain actuating signal which is then applied to the one-shot circuit 21' to produce the drive pulse of similar waveform to that of FIG. 6(1) at the output line (g'). This causes the transistor 24 to turn on. Therefore, the magnetic coil 25a' is supplied with a similar current to that of FIG. 6(3), thus causing the trailing curtain to run down and therefore the termination of the exposure.

Then, the signal forming circuit 29 produces a return control signal. Responsive to this signal, the one-shot circuits 22 and 22' each produce a drive pulse of similar waveform to that of FIG. 6(2). Therefore, the transistors 24 and 24' are turned on to select the second magnetic coils 25b and 25b' to be supplied with a similar current to that of FIG. 6(4). Thus, the leading and trailing curtains are driven to move to the initial positions.

Figure 1:
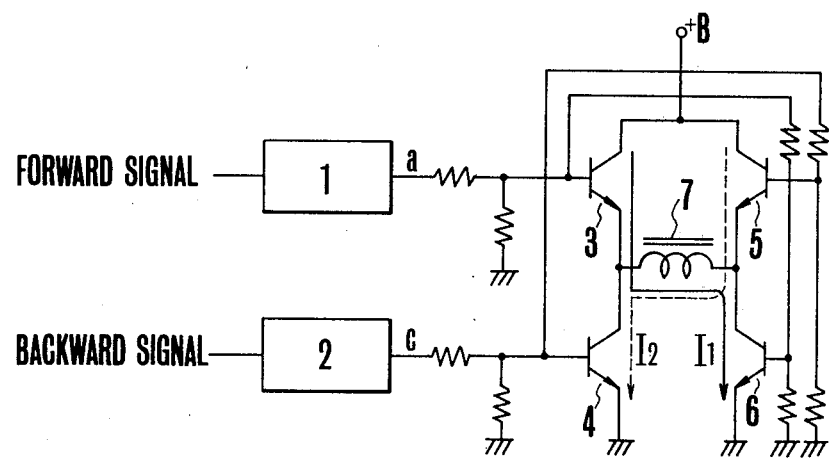
FIG. 1 is a diagram of a drive circuit for a leading curtain of a conventional electromagnetically operated shutter.
Figure 2:
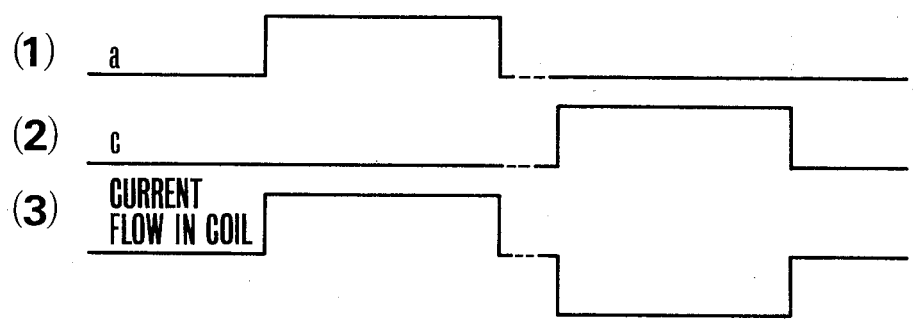
FIG. 2 is a pulse timing chart showing a manner in which the circuit of FIG. 1 operates.
Figure 3:
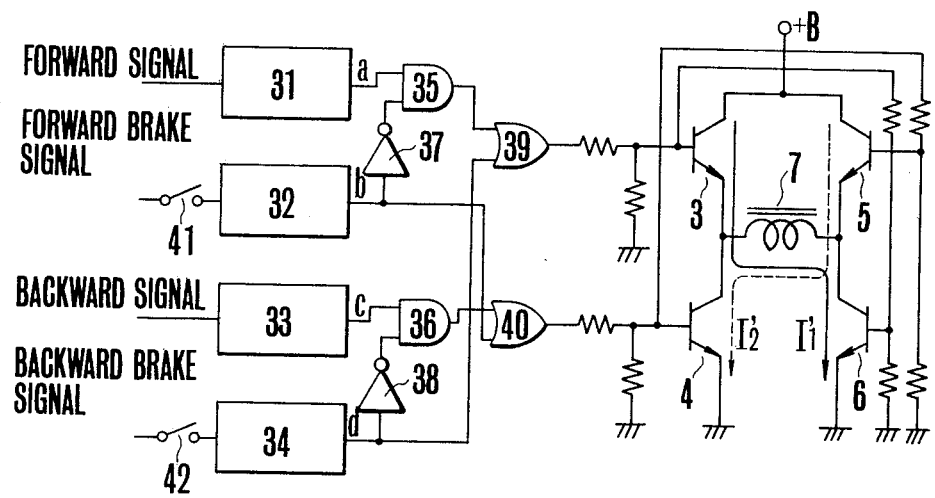
FIG. 3 is a diagram showing a modification of the circuit of FIG. 1 with addition of a bound preventing circuit.
Figure 4:
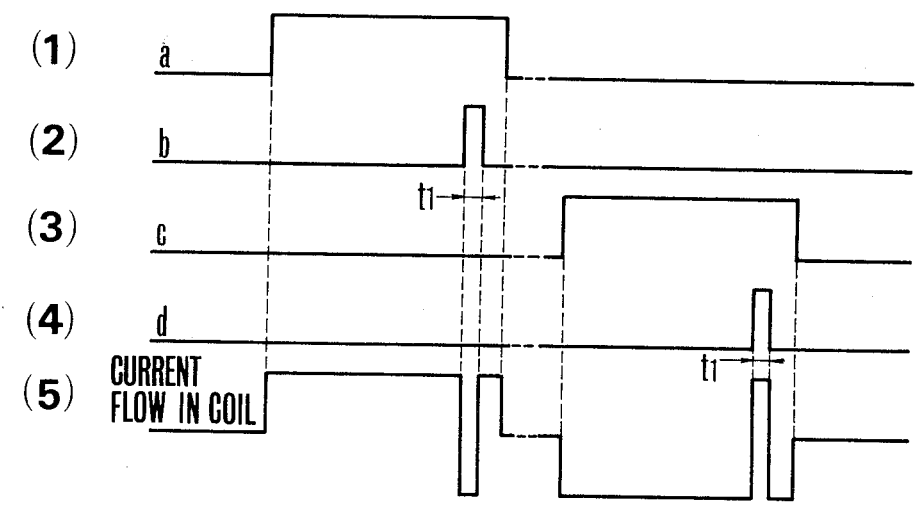
FIG. 4 is a pulse timing chart showing a manner in which the circuit of FIG. 3 operates.

It should be pointed out that since, in the circuit of FIG. 5, the current supply to the magnetic coils 25a, 25a', or 25b, 25b' from the battery is made in the series-connected form of the transistor 23, 23', or 24, 24', the voltage loss is reduced from that in the circuit of FIG. 1.

Figure 7:
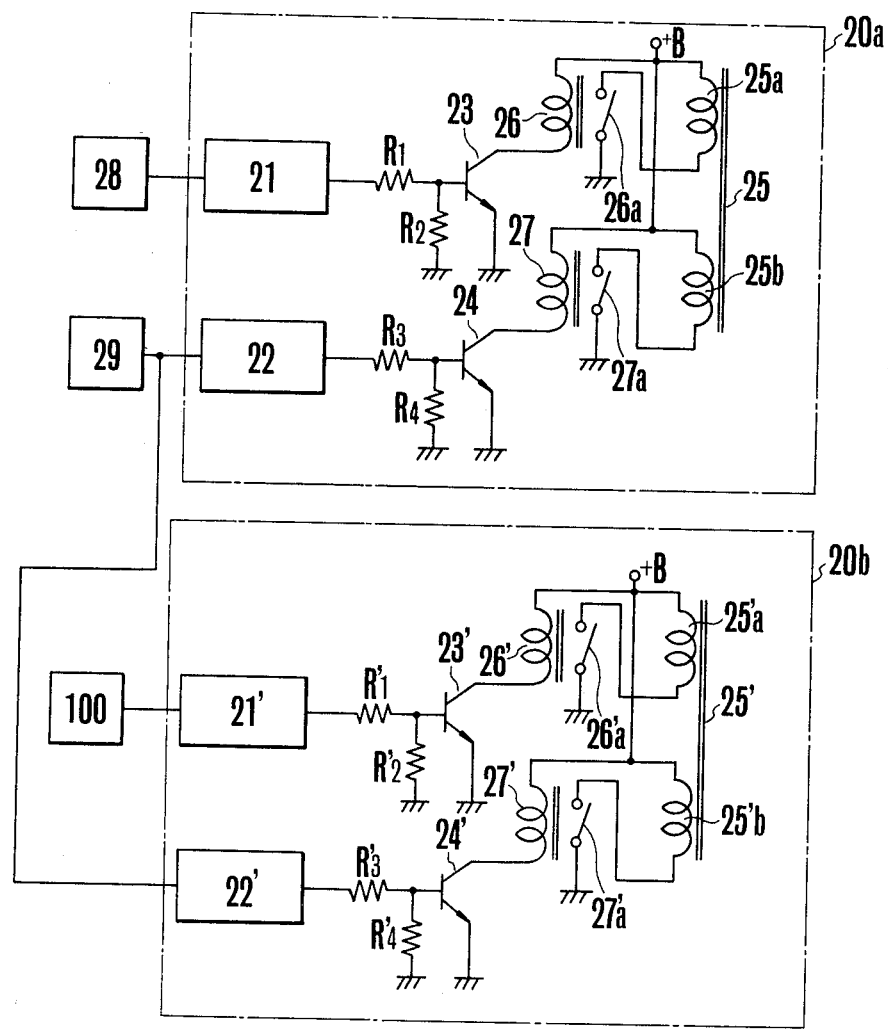
FIG. 7 is a diagram showing an example of modification of the circuit of FIG. 5.

In order to further reduce the voltage loss, the circuit of FIG. 5 may be modified as shown in FIG. 7. Different features from those of FIG. 5 will next be described below.

While the collectors of the transistors 23 and 23' are connected through respective relays 26 and 26' to the positive terminal +B of the battery, the other ends of the magnetic coils 25a and 25a' are instead connected through respective relay contacts 26a and 26a' to the circuit ground. Likewise, the transistors 24 and 24' are connected through respective relay coils 27 and 27' to the battery at +B, and the other ends of the magnetic coils 25b and 25b' are connected through relay contacts 27a and 27a' to the circuit ground.

Therefore, the outputs of the drive transistors 23, 23' and 24, 24' control the actuation of the relays 26, 26' and 27, 27' and the current supply to the magnetic coils 25, 25a' and 25b, 25b' is made through their relay contacts 26a, 26a' and 27a, 27a' with an advantage that the voltage of the battery can be fully utilized in application to the magnetic coils and it is made possible to use a low-voltage battery as the electrical power source of the shutter.

Figure 8:
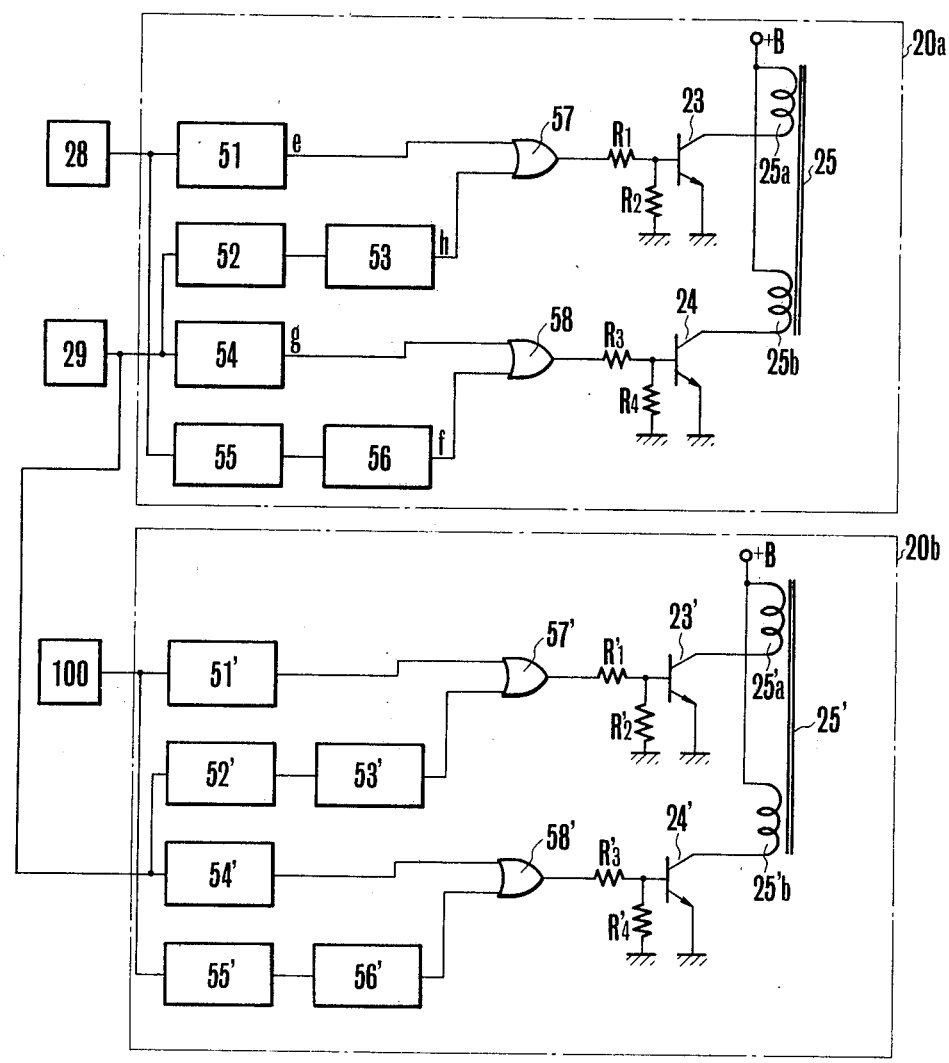
FIG. 8 is a diagram of a second embodiment of a drive circuit for the electromagnetically operated shutter according to the present invention.

Next, explanation is given with respect to a second embodiment of the present invention. FIG. 8 shows the circuitry of two electromagnetic drive devices of the two magnetic coil type provided with a means for preventing bound of the shutter from occurring at the terminal end of movement. A shutter leading curtain drive circuit 20a differs from that of FIG. 5 in that four one-shot circuits 51, 53, 54 and 56 are used in combination with delay circuits 52 and 55 and OR gates 57 and 58. A trailing curtain drive circuit 20b is similar in construction to the leading curtain drive circuit 20a, and the like parts are denoted by the same reference characters with prime.

Figure 9:
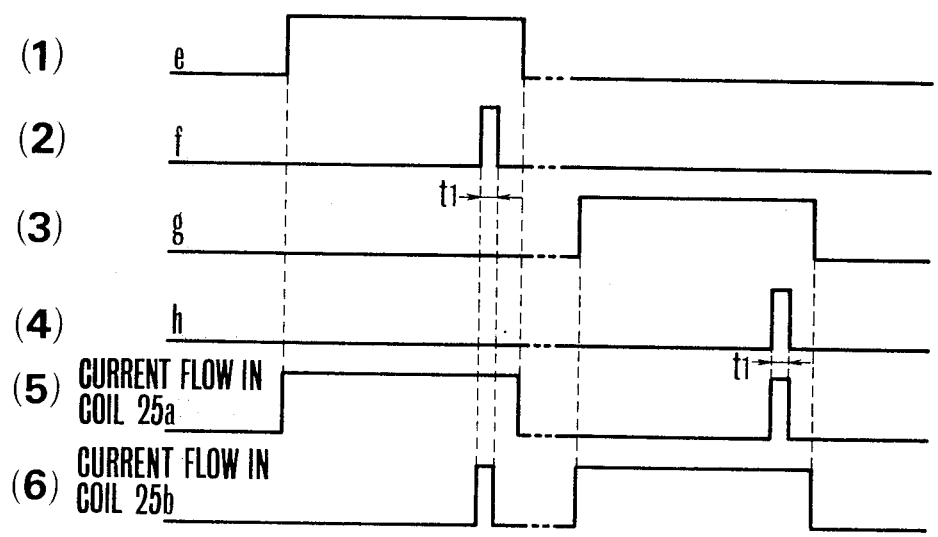
FIG. 9 is a pulse timing chart showing a manner in which the circuit of FIG. 8 operates.

In operating the circuit of FIG. 8, when the leading curtain actuating signal is applied to the one-shot circuit 51, a drive pulse as shown on line (1) in FIG. 9 is produced at its output line (e). This pulse is directed through the OR gate 57 to turn on the transistor 23, thereby a current is allowed to flow through the magnetic coil 25a. Thus, the leading curtain starts to run down. When the leading curtain nears the terminal end of movement, as the delay circuit 55 is activated by the above-described actuating signal, the one-shot circuit 56 responsive to the output of the delay circuit 55 produces an output signal as shown on line (2) in FIG. 9 which is then applied through the OR gate 58 to the transistor 24, thereby a current is allowed to flow through the coil 25b of opposite turn for a time t1. Thus, the magnetic flux generated by the coil 25a is cancelled out by that generated by the coil 25b to stop the leading curtain under the braking action. It is to be understood that in the circuit of FIG. 8, one of the coils is used for driving purposes, and the other for braking purposes.

Then, at the termination of duration of a time interval necessary to take a proper exposure, the exposure control circuit 100 produces the trailing curtain actuating signal. Responsive to this signal, the one-shot circuit 51' produces a drive pulse of similar waveform to that of FIG. 9(1) which is then applied through the OR gate 57' to turn on the transistor 23'. Thus, the trailing curtain starts to run down. Since on the other hand the above-described trailing curtain actuating signal causes the delay circuit 55' and one-shot circuit 56' to produce a similar pulse of short duration to that of FIG. 9(2), and this pulse is applied through the OR gate 58' to the transistor 24', the coil 25b' of opposite turn is supplied with a current beginning to flow near or at the terminal end of movement of the trailing curtain and continuing for a time t1. Therefore, the magnetic flux of the coil 25b' cancels out the magnetic flux of the coil 25a' so that the trailing curtain is braked.

When returning the leading and trailing curtains, a similar braking action is taken at a time near the terminal end of movement of each of the leading and trailing curtains, as the coils 25a and 25a' serve as the braking coils and are energized in response to the braking signal at that time while the coils 25b and 25b' are simultaneously energized in response to the return control signal.

Next explanation is given to a third embodiment of the present invention. This embodiment is adapted to make two exposures for each cycle of shutter operation. In other words, the one of the two shutter curtains which has functioned as the leading curtain in the first actuation of shutter release is to function as the trailing curtain for the next actuation of release.

Figure 10:
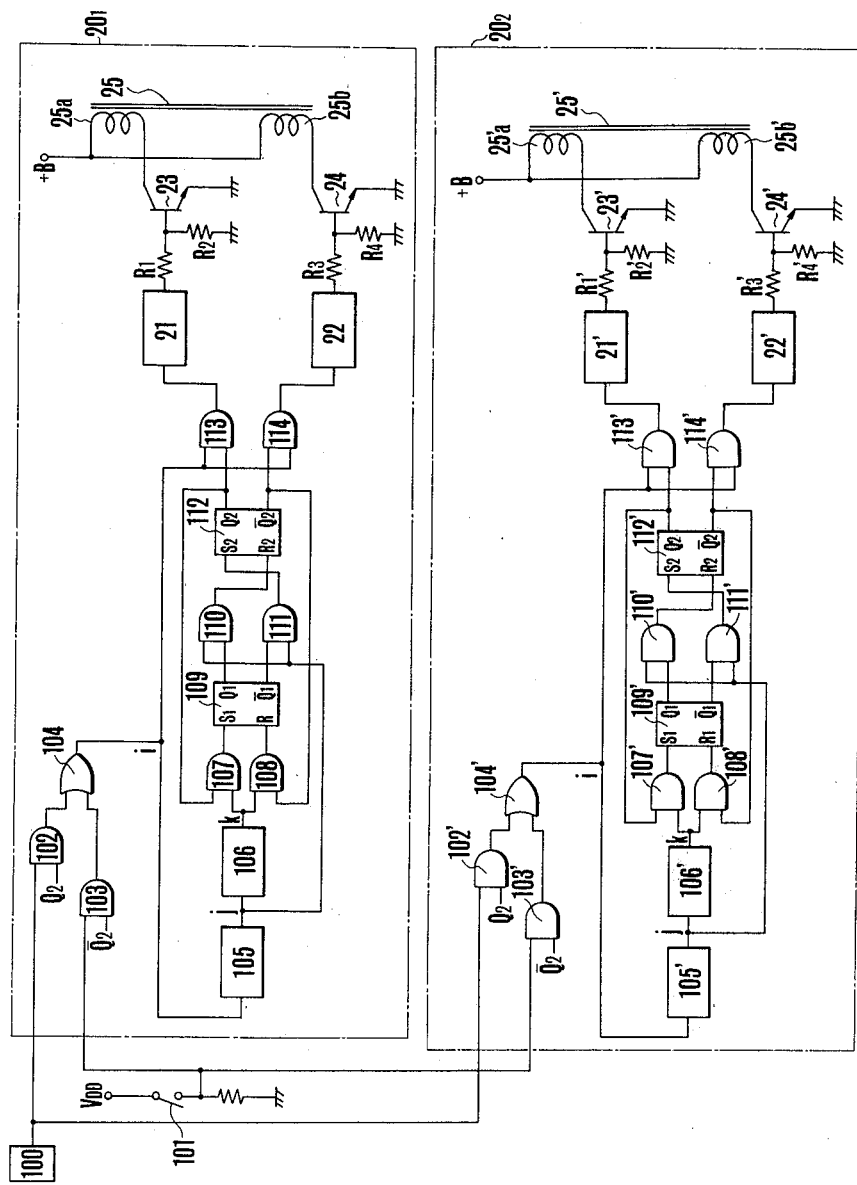
FIG. 10 is a diagram of a third embodiment of a drive circuit for the electromagnetically operated shutter according to the present invention.

In FIG. 10, 100 is an exposure time counting circuit for producing a trailing curtain actuating signal after the elapse of a time necessary to make a proper exposure as measured from the opening of the leading curtain. 101 is a release switch arranged to be closed when a shutter release is actuated. $20_1$ is a drive circuit for one of the shutter curtains, and $20_2$ is a drive circuit for the other curtain. The latter circuit is similar in construction to the former, and like parts are denoted by the same reference characters with prime and are not explained in any more detail.

The first-named drive circuit $20_1$ includes a one-shot circuit 105, a delay circuit 106, AND gates 102, 103, 107, 108, 110, 111, 113 and 114, an OR gate 104, and flip-flop circuits 109 and 112. The remaining parts are identical in construction and arrangement to those of FIG. 5, 23 and 24 being transistors, and 119 being an electromagnet having two coils 25a and 25b.

The operation of the circuit of FIG. 10 will next be explained by reference to the pulse timing chart of FIG. 11.

The flip-flop 109 is one of the drive circuits, $20_1$ first takes a Q1 output of low level, and a $\overline{Q1}$ of high level, and the flip-flop 112 takes a Q2 output of low level and a $\overline{Q2}$ output of high level. On the other hand, the flip-flop 109' in the other drive circuit $20_2$ takes a Q1 output of high level, and a $\overline{Q1}$ output of low level, and the flip-flop 112' takes a Q2 output of high level, and a $\overline{Q2}$ output of low level.

With one of the drive circuit, $20_1$, when the release switch 101 is turned on, since the $\overline{Q2}$ of the flip-flop 112 is of high level, the two inputs of the AND gate 103 simultaneously take high level and the AND gate 103 is opened to produce a signal (i) of high level which is applied through the OR gate 104 to the AND gates 113 and 114 at one inputs thereof. Since, at this time, the $\overline{Q2}$ output of the flip-flop 112 is of high level, the AND gate 114 is opened and its high level output signal triggers the one-shot circuit 22 to produce a drive pulse at the output thereof which is applied to turn on the transistor 24, thereby a current of FIG. 11(8) is allowed to flow through the magnetic coil 25b. Thus, the shutter curtain which is now selected as the leading one runs down to initiate an exposure. It is noted in connection with the other drive circuit $20_2$ that when the release switch 101 is turned on, since at this time the Q2 output of the flip-flop 112' is of high level, and the $\overline{Q2}$ is of low level, the AND gate 103' remains closed and the output of the OR gate 104' is of low level. Therefore, the magnetic coils 25a' and 25b' are not energized and the other curtain of the shutter does not run down yet.

At the termination of duration of a time interval necessary to take a proper exposure as measured from the start of a running down of the leading curtain, the exposure time counting circuit 100 produces an actuating signal for the trailing curtain. Since the Q2 output of the flip-flop 112' is of high level, the output of the AND gate 102' is changed to high level. This output of high level from the AND gate 102' is applied through the OR gate 104' and AND gate 113' to the one-shot circuit 21' which then produces a pulse. Responsive to this pulse, the transistor 23' turns on itself, causing a current to flow through the coil 25a' as shown in FIG. 11(10). Thus, the other curtain of the shutter which is selected as the trailing curtain runs down to terminate the first exposure, and the first half of one cycle of shutter operation is completed.

Figure 11:
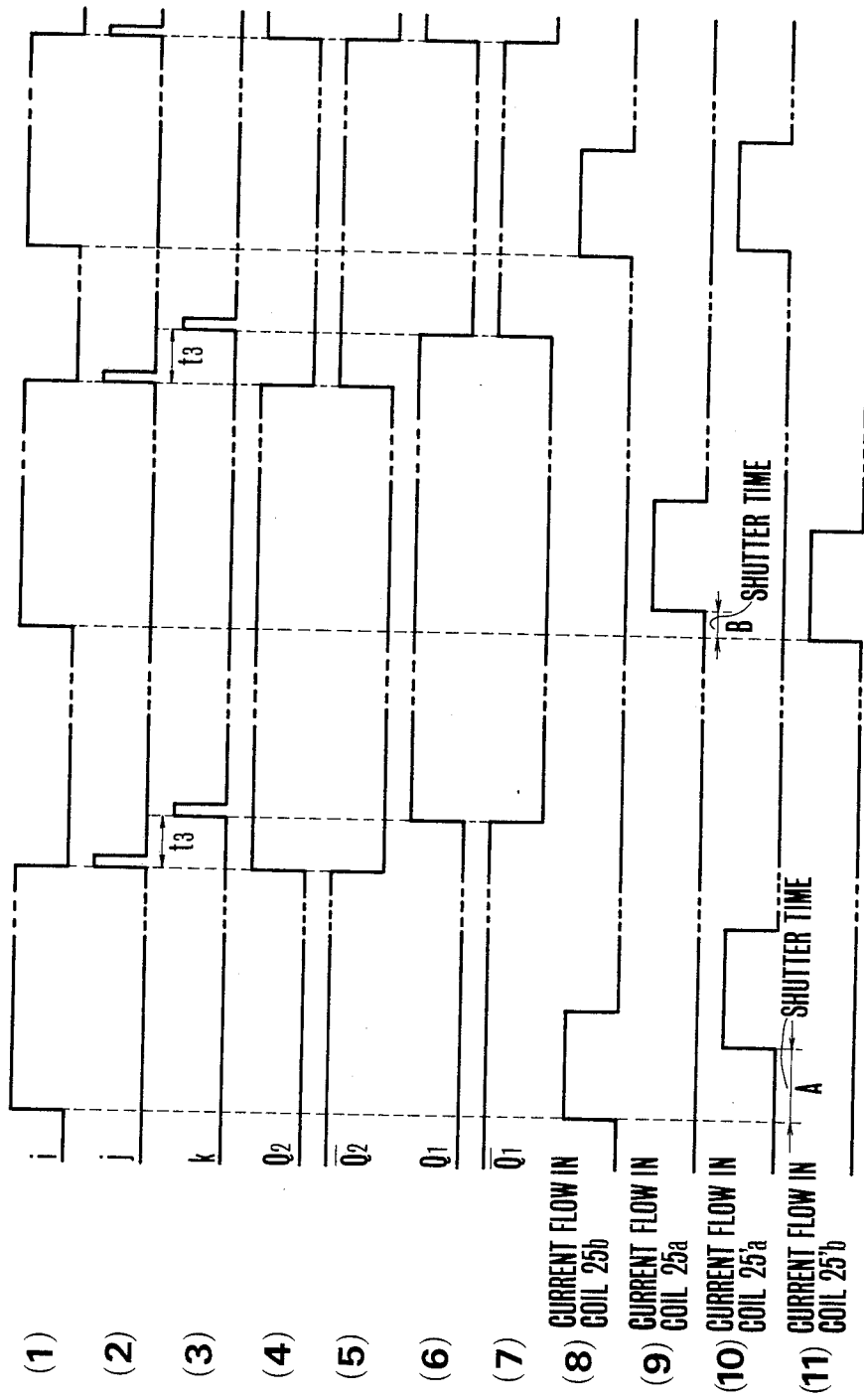
FIG. 11 is a pulse timing chart showing a manner in which the circuit of FIG. 10 operates.

Then, when the shutter button is released from its depression, one of the drive circuits, $20_1$ reacts to change the input (i) of the one-shot circuit 105 to low level as shown in FIG. 11(1). In synchronism with the falling edge of the pulse (i), there is produced a positive pulse of FIG. 11(2) at the output of the one-shot circuit 105. This pulse is routed to the AND gates 110 and 111 at one inputs thereof. Since, at this time, the Q1 output of the flip-flop 109 is of high level, the AND gate 11 is opened and this high level signal is applied to set the flip-flop 112 with the change of its Q2 output to high level and of its $\overline{Q2}$ output to low level (FIGS. 11(4) and (5)). Again the output of the one-shot circuit 105 after having been delayed a time t3 by the delay circuit 106 as shown in FIG. 11(3) is applied to the AND gates 107 and 108 at one inputs thereof. Since, at this time, the Q2 output of the flip-flop 112 is of high level, the AND gate 107 is opened and its output is applied to set the flip-flop 109 with the change of its Q1 output to high level and of its $\overline{Q1}$ output to low level.

Also in the other drive circuit $20_2$, the release of the shutter button from its depression is followed by the production of an output pulse from the one-shot circuit 105′. This signal is applied to reset the flip-flop 112′. In delay of the time t3 by the delay circuit 106′, the AND gate 108 is opened to reset the flip-flop 109′.

As a result, the output conditions of the flip-flops 109 and 112 in one drive circuit $20_1$ and those of the flip-flops 109′ and 112′ in the other drive circuit $20_2$ are inverted from their initial conditions.

When the shutter button is depressed for the second time, the release switch 101 is closed again. With the second drive circuit $20_2$, since at this time the $\overline{Q2}$ of the flip-flop 112′ is of high level, both of the inputs of the AND gate 103′ simultaneously take high level, and the AND gate 103′ is opened to produce the signal (i) of high level which is applied through the OR gate 104′ to the AND gates 113′ and 114′ at one inputs thereof. Since at this time the $\overline{Q2}$ of the flip-flop 112′ is of high level, the AND gate 114′ is opened, and its output signal of high level triggers the one-shot circuit 22′ to produce a drive pulse at the output thereof. By this pulse, the transistor 24′ is turned on to energize the magnetic coil $25b'$ as the current of FIG. 11(11) flows therethrough. Thus, that of the shutter curtains which functioned as the trailing one in the preceding operation first runs down as is selected as the leading one. With the first drive circuit $20_1$, when the release switch 101 is turned on, since at this time the Q2 output of the flip-flop 112 is of high level, and the $\overline{Q2}$ output of low level, the AND gate 103 is not opened, and the output of the OR gate 104 remains of low level. Therefore, no current flows to the magnetic coils 25a and 25b, and the other shutter curtain does not run down yet.

At the termination of duration of a time interval necessary to take a proper exposure as measured from the start of a running down of the second-named shutter curtain, the exposure time counting circuit 100 produces a trailing curtain actuating signal. Since the output Q2 of the flip-flop 112 is of high level, the output of the AND gate 102 changes to high level. This output of high level from the AND gate 102 is applied through the OR gate 104 and AND gate 113 to the one-shot circuit 21 which then produces a pulse. Responsive to this pulse, the transistor 23 turns on, causing a current of FIG. 11(9) to flow through the coil 25a. Thus, the first-named shutter curtain as the trailing one runs down to terminate the second exposure, and the second half of the one cycle of shutter operation is completed.

Then, when the shutter button is released from its depression, the second drive circuit $20_2$ reacts to change the input of the one-shot 105′ to low level. In synchronism with the falling edge of this pulse, the one-shot circuit 105′ produces a positive pulse. This signal is applied to the AND gates 110′ and 111′ at one inputs thereof. Since, at this time, the $\overline{Q1}$ output of the flip-flop 109′ is of high level, the AND gate 111′ is opened and its output signal of high level is applied to set the flip-flop 112′ with the change of its Q2 output to high level and of its $\overline{Q2}$ output to low level. Again, the output of the one-shot circuit 105′ is delayed a time t3 by the delay circuit 106′, and this signal is applied to the AND gate 107′ and 108′ at one inputs thereof. Since, at this time, the Q2 output of the flip-flop 112′ is of high level, the AND gate 107′ opens and its output is applied to set the flip-flop 109′ with the change of its Q1 output to high level and of its $\overline{Q1}$ output to low level.

With the first drive circuit $20_1$, when the shutter button is released from its depression, the one-shot circuit 105 produces an output pulse which is then applied to open the AND gate 110. By this signal, the flip-flop 112 is reset. In delay of t3 by the delay circuit 106, the AND gate 108 opens to reset the flip-flop 109. Thus, the circuit of FIG. 10 regains the initial state.

It will be appreciated that the present invention provides for an electromagnetically operated shutter with the magnetic winding as the electromagnetic drive source divided into two parts one of which is selected in performing the forward movement of the shutter, and the other of which is used in performing the backward movement thereof, and that the present invention contemplates the use of the latter winding part in exerting a braking action near or at the terminal end of a running down of the shutter which is driven by the former winding part. Further, the drive circuit is of simple structure and can utilize the voltage with high efficiency. This makes it possible to increase the accuracy and reliability of the electromagnetically operated shutter despite the use of an electrical power source or battery of small capacity with low voltage.

What is claimed is:

1. In an electromagnetically operated shutter having a first shutter member and a second shutter member with a slit opening formed therebetween being rendered adjustable to control an exposure, the improvement comprising:
    (a) a first electromagnet for driving said first shutter member, said electromagnet having first and second magnetic coils which produce magnetic fluxes in directions opposite to each other, whereby the current supply to said first magnetic coil causes forward movement of said first shutter member, and the current supply to said second magnetic coil causes backward movement of said first shutter member;
    (b) a first switching element connected to said first magnetic coil, said switching element when actuated causing current to flow through said first magnetic coil;
    (c) a second switching element connected to said second magnetic coil, said element when actuated causing current to flow through said second magnetic coil;
    (d) a second electromagnet for driving said second shutter member to move, said electromagnet having third and fourth magnetic coils which produce magnetic fluxes in directions opposite to each other, whereby the current supply to said third magnetic coil causes forward movement of said second shutter member and the current supply to said fourth magnetic coil causes backward movement of said second shutter member;

(e) a third switching element connected to said third magnetic coil, said element when actuated allowing current to flow through said third magnetic coil;

(f) a fourth switching element connected to said fourth magnetic coil, said element when actuated allowing current to flow through said fourth magnetic coil;

(g) release actuating signal forming means;

(h) counting means for producing a shutter closing signal in a time necessary to take an exposure from the start of an exposure actuation;

(i) a first circuit alternatively receptive of a release actuating signal and a shutter closing signal, said circuit responsive to said release actuating signal for producing a signal which causes said first switching element to be actuated, and responsive to said shutter closing signal for producing a signal which causes said second switching element to be actuated; and (j) a second circuit receptive of said shutter closing signal and said release actuating signal in the reverse order to that in which they enter said first circuit, said circuit responsive to said shutter closing signal for producing a signal which causes said third element to be actuated, and responsive to said release actuating signal for producing a signal which causes said fourth element to be actuated.

2. An electromagnetically operated shutter according to claim 1, wherein said first, second, third and fourth switching elements are transistors.

3. In an electromagnetically operated shutter arranged to effect exposure control by adjusting a slit interval defined jointly by first and second shutter members, the improvement comprising:

a first electromagnet for driving said first shutter member, said electromagnet having first and second exciting coils which produce magnetic fluxes in directions opposite to each other, said first shutter member being arranged to make a forward travel when the first exciting coil is energized and to make a return travel when the second exciting coil is energized;

a first switching element coupled to said first exciting coil, which is arranged to be energized when said first switching element turns on;

a second switching element coupled to said second exciting coil, which is arranged to be energized when said second switching element turns on;

a second electromagnet for driving said second shutter member, said electromagnet having third and fourth exciting coils which produce magnetic fluxes in directions opposite to each other, said second shutter member being arranged to make a forward travel when the third exciting coil is energized and to make a return travel when the fourth exciting coil is energized;

a third switching element coupled to said third exciting coil, which is arranged to be energized when said third switching element turns on;

a fourth switching element coupled to said fourth exciting coil, which is arranged to be energized when said fourth switching element turns on;

a first pulse generating circuit for producing a pulse of predetermined width which causes said first switching element to turn on, said circuit being arranged to be actuated by a start signal;

a second pulse generating circuit for producing a pulse of predetermined width which causes said third switching element to turn on, said circuit being arranged to be actuated by an exposure time count completion signal; and a third pulse generating circuit for producing a pulse of predetermined width which causes said second and fourth switching elements to turn on, said circuit being arranged to be actuated by a return signal.

4. An electromagnetically operated shutter according to claim 3, wherein said first, second, third and fourth switching elements are relay contacts.

5. An electromagnetically operated shutter according to claim 4, further comprising:

a first transistor which is caused to turn on by the pulse output of said first pulse generating circuit;

a second transistor which is caused to turn on by the pulse output of said second pulse generating circuit;

third and fourth transistors which are caused to turn on by the pulse output of said third pulse generating circuit;

a first relay which is energized when said first transistor turns on, said first relay being arranged to control the relay contact which serves as the first switching element;

a second relay which is energized when said second transistor turns on, said second relay being arranged to control the relay which serves as the third switching element;

a third relay which is energized when said third transistor turns on, said third relay being arranged to control the relay contact which serves as the second switching element; and a fourth relay which is energized when said fourth transistor turns on, said fourth relay being arranged to control the relay contact which serves as the fourth switching element.

6. An electromagnetically operated shutter according to claim 3, further comprising:

a first circuit arranged to produce a pulse which turns said second switching element momentarily on, said first circuit being arranged to produce said pulse just for a moment immediately before the fall of the pulse output of said first pulse generating circuit, lagging a given length of time after said start signal, and being thus arranged to have the forward travel of said first shutter member controlled; and a second circuit arranged to produce a pulse which turns said fourth switching element momentarily on, said second circuit being arranged to produce said pulse just for a moment immediately before the fall of the pulse output of said second pulse generating circuit, lagging a given length of time after said completion signal, and being thus arranged to have the forward travel of said second shutter member controlled.

* * * * *